United States Patent [19]

Kuznetsov et al.

[11] Patent Number: 4,532,458
[45] Date of Patent: Jul. 30, 1985

[54] VARIABLE-SPEED ELECTRICAL MACHINES

[75] Inventors: Stephen B. Kuznetsov, Pittsburgh, Pa.; Eric R. Laithwaite, Surbiton, England

[73] Assignee: National Research Development Corporation, London, England

[21] Appl. No.: 375,267

[22] PCT Filed: Sep. 23, 1981

[86] PCT No.: PCT/GB81/00199
§ 371 Date: Apr. 30, 1982
§ 102(e) Date: Apr. 30, 1982

[87] PCT Pub. No.: WO82/01283
PCT Pub. Date: Apr. 15, 1982

[30] Foreign Application Priority Data
Sep. 26, 1980 [GB] United Kingdom ............ 8031128

[51] Int. Cl.³ .............................................. H02P 7/74
[52] U.S. Cl. .................................... 318/111; 318/113; 318/733; 318/734; 318/748; 318/244
[58] Field of Search ............... 318/111, 112, 113, 733, 318/734, 735, 736, 737, 738, 739, 748, 753, 754, 755, 761, 771, 775, 776, 777, 797, 244

[56] References Cited
U.S. PATENT DOCUMENTS

| | | | |
|---|---|---|---|
| 2,018,287 | 10/1935 | Sousedik | 318/733 |
| 2,341,095 | 2/1944 | Hansen | 318/733 |
| 2,500,595 | 3/1950 | James et al. | 318/111 X |
| 3,161,795 | 12/1964 | Bekey | 318/244 |
| 4,189,654 | 2/1980 | Mourier | 318/797 X |
| 4,208,620 | 6/1980 | Ringland | 318/111 |

Primary Examiner—William M. Shoop
Assistant Examiner—Paul Shik Luen Ip
Attorney, Agent, or Firm—Cushman, Darby & Cushman

[57] ABSTRACT

An arrangement to provide variation of the speed or other operating parameters of an electrical machine without connection to the rotor. The machine is of the induction type having a winding in separate parts to create a flux movable in the air-gap different speeds by the alteration of current in a part of the winding. In one example the current is altered by a variable impedance connected to one winding part, the other part being connected to an electrical supply.

Another example, FIG. 6, shows two machines (NM₁, NM₂) arranged to drive a rail vehicle through smooth rail wheels attached to the machine rotor axles. A single, variable-frequency, inverter (NI) drives both machines and is connected to part (MP) of each machine winding. Other parts (AP) of each machine winding are connected together by a link (NC). In operation power (real or reactive) is transferred between the machines along the link to equalize the torque of the machines. Run-away of one machine while the other stalls is thereby avoided.

4 Claims, 14 Drawing Figures

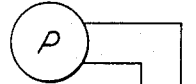

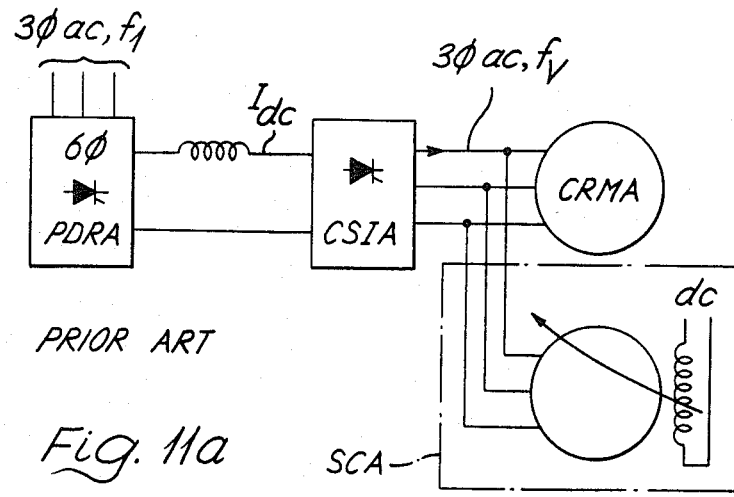
PRIOR ART
Fig. 11a
Fig. 11b
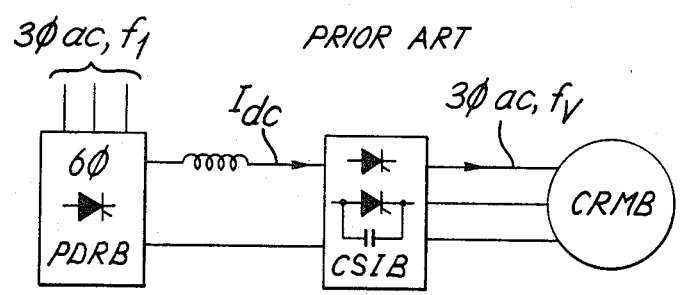
PRIOR ART
Fig. 11c
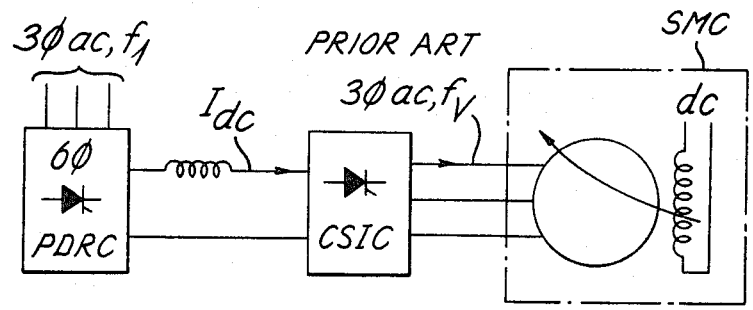
PRIOR ART

VARIABLE-SPEED ELECTRICAL MACHINES

This invention relates to electrical machines which can be operated over a range of speeds.

Variable-speed electrical machines exist in various forms but in general to achieve a variable speed a machine has to have a more complicated construction, and often associated complex control circuits, than a machine for single speed operation. Examples include d.c. machines with commutators and brush gear and field and/or armature current control equipment and a.c. machines with complex inverters to provide reliable commutation of s.c.r. devices under a range of operating conditions. Compound machines or machine sets, such as the Ward-Leonard arrangement, are also known. Other approaches include pole-switching, e.g. a 2/16 pole induction motor, and the pole amplitude modulation technique. The pole-switching technique while simple and robust has the penalty that a larger machine frame is needed as in effect the windings for both a 2 pole and a 16 pole machine have to be accommodated.

With the present requirements to save both energy and materials there is a need for electrical machines which are economical in power and material consumption while a simple and inexpensive variable speed capability for a machine with the rugged construction of the induction motor type is also desirable. Generators with the ability to operate well at a range of speeds are also in demand, particularly for wind or water power drive.

Speed control for machines of the induction type, in practical terms, is preferably at constant efficiency or constant torque and varies the synchronous speed of the machine, that is the speed, $V_s$, of the electromagnetic wave along the air gap periphery where $V_s = 2T_p f$. $T_p$ is the pole pitch and f the supply frequency. Clearly the pole switching technique varies $T_p$. The variable-frequency inverter or mechanical commutator techniques vary f. The pole amplitude modulation technique varies the value of $V_s$ by using a specific form of winding and external switches. Where some form of power conversion, e.g. an inverter, is used it is also possible to achieve speed control by varying the voltage supplied to the machine.

It is an object of the invention to provide an improved electrical machine arrangement for economic operation over a range of speeds.

In the Specification of UK Published Patent Application 2058478 and corresponding Applications in other countries including U.S. Ser. No., 179,781, incorporated herein by reference, there is described an electrical machine having a space-transient in the field conditions. Such a transient is there described as being provided in various ways including the use of some poles with shorter pitch than the remainder. The existence of the space-transient enables a motor form of the machine to recover energy from the rotor in a beneficial phase relation with the energy supplied to the machine. The recovered energy can be applied to improve the power factor or efficiency or other operating parameter of the machine, as described in the above mentioned specifications.

According to the present invention there is provided an electrical machine arrangement having an air gap and a winding in separate parts to create in the air-gap, in operation, a machine air-gap moving flux having a space-transient the arrangement including means to alter a current in a part of the winding to vary the effective speed of movement of the flux along the air-gap, whereby the adjustment provides continuously variable control of at least one of the machine operating parameters including speed, torque and efficiency.

Some of the separate parts of the winding may be connected to an electrical power network and others of the separate parts to a variable impedance.

Some of the separate parts of the winding may be connected to an electrical power network in a specific phase arrangement and others of the separate parts connected thereto in a different phase arrangement to apply rotor induced voltage to said some winding parts in parallel with a power network voltage but with a phase variable in operation to produce a self-compensating equal torque characteristic around the synchronous speed.

A frequent arrangement of electrical machines is two or more machines having windings connected to an electrical power system and having a movable part of each machine coupled without a rigid connection. This is referred to hereafter as multiple-operation of machines.

Examples of arrangements of two or more machines where the machines are motors include vehicle traction systems where each motor drives one axle of the vehicle, as in a railway vehicle, and material conveyor or treatment systems as in a steel rolling mill or paper mill. The couplings are respectively the rail, the steel billet and the paper web itself or a conveyor.

A serious problem of such systems, well-known in the art, is that the overall operating conditions are never absolutely identical and therefore each machine will provide a slightly different torque. Such torque differences will tend to increase the operating condition differences in the absence of the rigid connection. The consequence in, for example, traction systems, is that the motor on one axle attempts to supply all the tractive effort and is destroyed by overloading while another axle motor supplies none of the effort.

One known technique is to provide an individually controlled supply to each motor. Again using the traction system example, each motor is an induction motor and each is supplied with controlled frequency alternating current from an a.c. or d.c. supply via a rectifier/inverter or inverter as appropriate. The frequency of the alternating current is controlled to prevent run-away of a motor by providing an equal torque at each motor. Such a system is able to cope with most operating conditions but involves a heavy penalty in additional equipment increasing capital cost and also increasing running costs by increasing maintenance costs and tare weight which increases the power consumption for a given load.

It is an object of a particular aspect of the invention to provide an improved arrangement for multiply-operated electrical machines.

According to this aspect of the invention there is provided a machine arrangement for multiple-operation, as hereinbefore defined, including at least two separate electrical machines each having a stator and a rotor and individual mechanical load coupling means on the rotors for a common mechanical load each machine having a stator winding including at least a first and a second section and connections to each said section, the arrangement including a parallel electrical connection between a first section of each machine and a series electrical connection between second sections of each machine and an electrical supply network connection to said parallel connection, whereby in operation variation of the speed at the coupling to a common mechanical load is compensated by current flow in the series connection equalizing the torque of the machines.

The machines may be traction motors driving a railway vehicle on a metal rail or rails by coupling the rails with smooth wheels on the axle of each machine rotor whereby machine speed variation with different individual axle driving conditions is compensated for. The first section may be wound with a lower pole pitch than the second section.

The above-mentioned patent applications, and a paper by E. R. Laithwaite and S. B. Kuznetsov read and published at the I.E.E.E. Winter Power Meeting, New York, USA, February 1980, describe electrical machines for continuously generating reactive KVA which give improved machine performance, e.g. better power factor and leading power factor in a brushless induction machine. Briefly the machines described are a.c. machines having a primary winding modified to create continuously occurring transient electromagnetic conditions in distinction from the steady dynamic conditions employed hitherto in induction and synchronous machines. In one form for a cylindrical machine part of the stator is arranged to have a pole-pitch shorter than normal. For example a nominal ten-pole machine is arranged to have poles as follows:

4-1*-4-1*.

1* indicates that more than a whole pole is provided in the space appropriate to one nominal pole. When the inductively coupled rotor, conveniently of squirrel-cage "solid" construction, passes from beneath the 4 pole stator region to beneath the 1* pole region rotor current "memorised" from the 4 pole section causes current in 1* pole section. The current caused in the 1* pole section can be of unity or leading power factor. In use as a motor the 4 pole sections provide propulsion and the 1* pole sections permit recovery of power and control the quadrature flux component.

Embodiments of the invention will now be described with reference to the accompanying drawings in which:

FIG. 5 shows a traction motor speed control arrangement of the prior art.

FIG. 6 shows a traction motor speed control arrangement according to the invention.

FIGS. 11a,b,c shows various prior art a.c.—a.c. converter motor drive systems.

Figure 12:
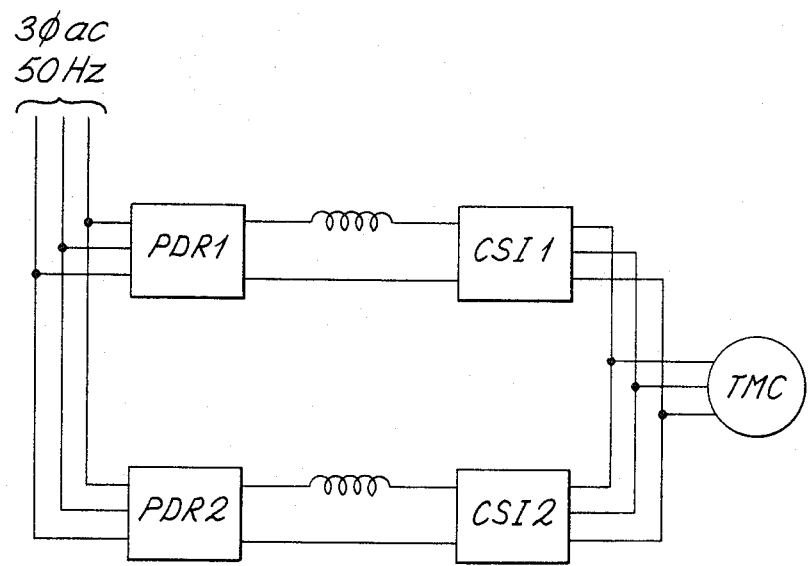

FIG. 12 shows an arrangement of a naturally commutated motor with an alternative start-up procedure.

Figure 1:
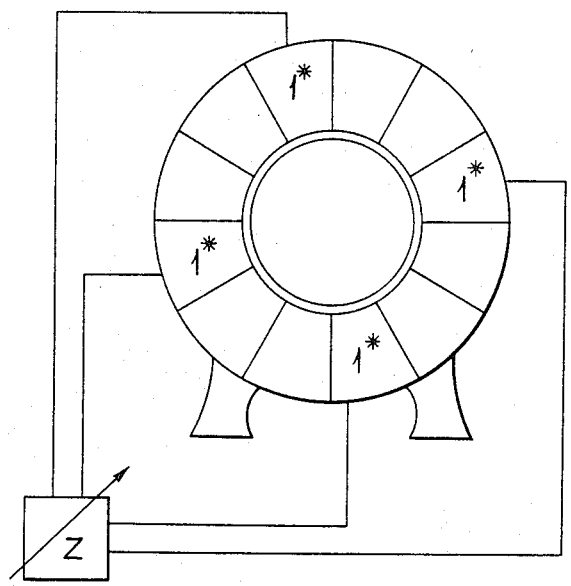
FIG. 1 represents schematically a speed-controlled electrical machine according to the invention.

FIG. 1 represents schematically an electrical machine according to the invention wound on a conventional 12 pole cylindrical wound stator/squirrel cage rotor frame. The winding arrangement is actually 2-1*-2-1*-2-1*-2-1* with 1* indicating the shorter pole pitch portions (as above). The winding is made so that one connection can be made to the conventional poles as a group and another connection to the shorter pole pitch poles as a group. For convenience the conventional poles are referred to as "mains excited" and the others as "rotor excited". It is to be noted that these terms do not limit the connection arrangements and that the "rotor excited" poles are not connected to a rotor. Supply connections are not shown. Although shown as stator windings with the advantage that connections to moving windings are not needed, it is made clear that the use of these windings on the rotor is not excluded if it is convenient or appropriate to place them wholly or partly on the rotor.

Figure 2:
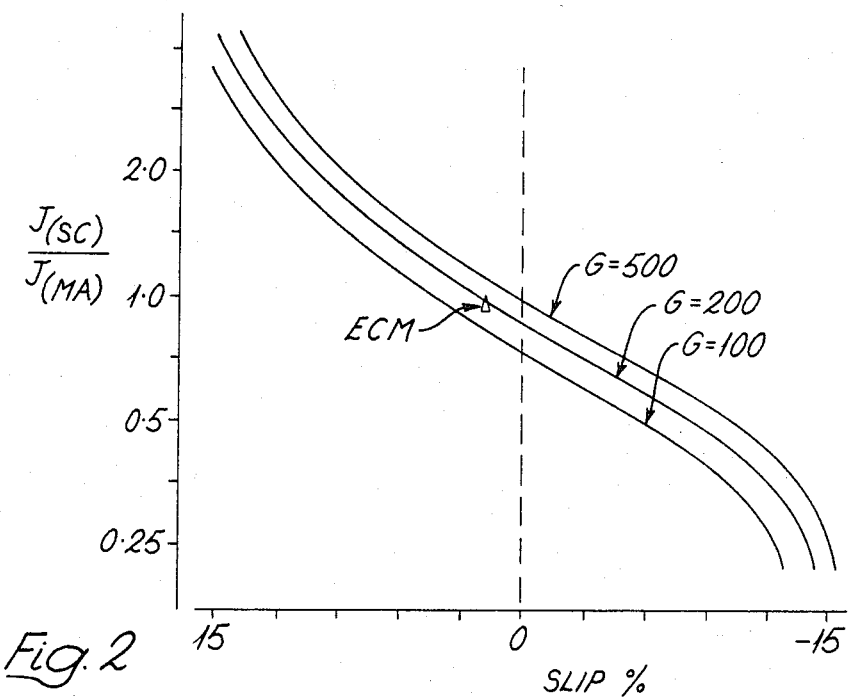
FIG. 2 shows typical speed characterisitcs for machines of the FIG. 1 arrangement.

In one speed control configuration the "rotor excited" poles are connected to a variable impedance Z external to the machine. By using this impedance to vary the current loading of these poles with respect to that in the "mains excited" poles the effective flux speed along the air-gap and therefore the slip and the speed of the machine can be adjusted over a significant range. This range can be about 25% of nominal speed for machines of different "Goodness Factor G", as indicated in FIG. 2. $J_{(SC)}$ indicates the "rotor excited" pole current loading and $J_{(MA)}$ the "mains excited" pole current loading. ECM indicates the operating position for an "Equivalent Conventional Machine" i.e. a 12 pole machine on this frame. The speed variation will be at substantially constant torque while the rotor excess losses will not be larger than the stator copper losses, the largest losses in the machine. If constant torque speed control is required the load profile must be known so that the machine can be designed to suit this profile.

Although a wide range of values of the ratio of "mains" poles to "rotor" poles can be used the range of 3:1 to 2:1 is likely to give a good practical compromise between operating flexibility and efficiency. If the number of "mains"/"rotor" poles sections is increased the range of speed at constant torque increases. If the number of sections is reduced the rotor excess losses are reduced improving the efficiency.

There is of course some periodic variation of air-gap flux distribution. However if a reasonably high average value, say 0.75 Tesla r.m.s., is maintained satisfactory operation at stable shaft speeds is achieved.

The presence of different currents in the "rotor" pole and "mains" pole windings creates a condition in which the slip is not constant around the machine but has different values from point to point along the "mains" winding. Nonetheless the shaft speed quickly stabilizes in operation at a definite and repeatable operating point. The difference between the currents in the "rotor" windings and "mains" windings causes a change in the in-phase (Bp) and quadrature (Bq) air-gap flux components under the "mains" entry and exit poles. This change will satisfy the condition $$\int Jr d\theta = 0$$

where Jr is the rotor current density and $\theta$ the angle around the rotor cage periphery. As mentioned above speed control at constant torque is more effective with more numerous "mains"/"rotor" pole alternations while retaining a reasonable average air-gap flux density.

Figure 3:
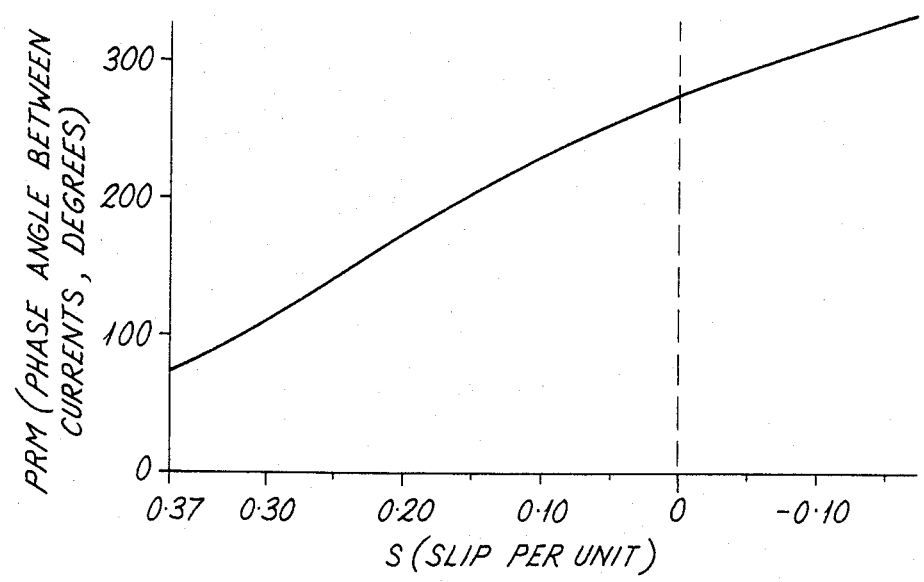
FIGS. 3 and 4 show graphs useful in understanding the speed/torque control of the machines described herein.

In another speed control configuration to vary the apparent synchronous speed of one machine no external reactors are required. To achieve the variation of current loading exerted by the "rotor" poles the phasing of the "rotor" poles is arranged to vary with respect to that of the "mains" poles. The induced voltage of the "rotor" poles should be just about equal to the line voltage at the "mains" poles. The variation of phase of the voltage induced in the "rotor" poles, with respect to that in the "mains" poles, depends on slip approximately in a second-order manner. The graph in FIG. 3 shows a plot of phase angle between "rotor" and "mains" currents, quantity PRM, against slip on a per unit basis at constant "mains" current. This graph is for a 50 Hz linear machine with the "rotor" poles loaded for the purpose of the measurements by an impedance of (0.08+j2.13) ohms/phase but is representative of machines embodying the invention operated at 50 Hz. It is an important feature of this aspect of the invention that the windings for both "mains" and "rotor" poles have a fixed number of turns and no tappings or switch connections are needed. The link between the "rotor" and "mains" poles is passive and fixed, the phase change of the rotor induced voltage bringing about the control action. This arrangement is not specifically shown in the drawings as it is produced by appropriate selection of the windings for allocation between the "mains" and "rotor" poles, with the link provided in the winding connections during manufacture.

Figure 4:
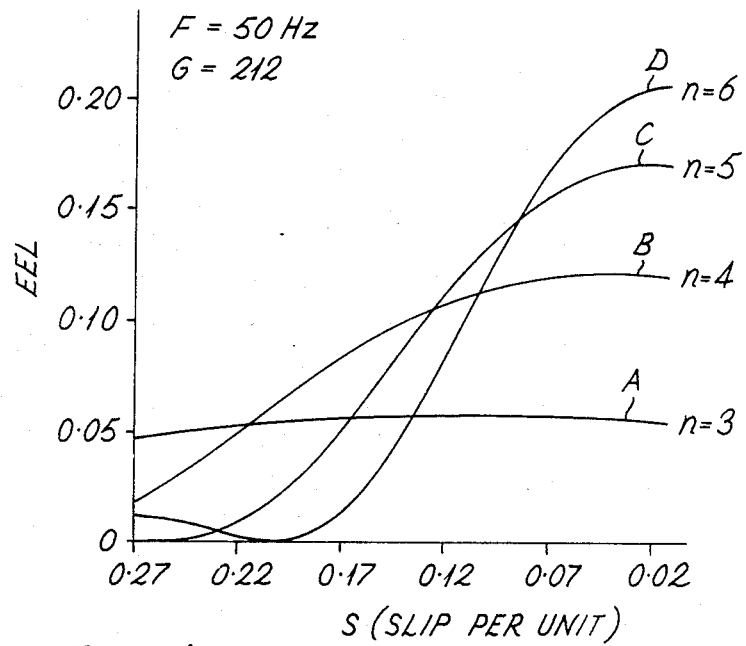

In the machines described in the above-mentioned Applications, in which power factor is improved by regeneration of reactive voltamperes, the induced voltage in the "rotor" poles must be significantly higher than the supply voltage, at least 20%, whereas for speed control substantially equal voltages are required. Furthermore for speed control the variation of exit-edge (of the "mains" poles) loss voltamperes (EEL) with slip (s) should be as small as possible whereas for power factor improvement the variation should be as sharp as possible with preferably a peak value between rated slip and synchronous speed, i.e. no slip. FIG. 4 shows a variation (A) more suitable for speed control, using 3 poles in each "mains" group, while the other variations (B,C,D) are more suitable for power factor improvement having a steep characteristic and a peak near to synchronous speed.

FIG. 5 shows in outline a known contemporary induction motor traction system. Induction motors are attractive for traction purposes as they are robust, without brush gear and commutators and can be provided with speed control by supplying them from an a.c. or d.c. power source (P) via a variable frequency inverter. However when several axles of a vehicle or train are provided with individual motors, as is the most practical arrangement for efficient construction and power economy, then each motor $M_1$, $M_2$ must have its own control means and variable frequency inverter $I_1$, $I_2$ to ensure that differences, e.g. in wheel size and therefore axle speed, do not cause uneven division of traction effort between motors. This is a serious penalty and can in some cases lead to the adoption of the conventional d.c. commutator motor and rheostatic current control to avoid the complexities of multiple inverters and supply frequencies f1, f2 while accepting the lower efficiency and higher maintenance costs.

One aspect of the present invention applies to traction induction motors and provides a solution to the torque division problem.

FIG. 6 shows a traction motor arrangement embodying the present invention. It will be seen that both machines $NM_1$, $NM_2$, or each machine if more than two, are supplied by one inverter, NI, which applies the same frequency, $f_n$, to each machine. The invention provides a means of transferring power (which may be real or reactive) from one machine to another to compensate for potential torque differences and thereby equalize the torque from each machine despite axle speed differences.

In one specific form of the machine disclosed in the above Applications a conventional induction motor frame and rotor is provided with a stator partly wound in one pole-pitch and partly in another. Generally the greater part (the main part) MP is wound in a pole-pitch conventionally appropriate to the intended use of the machine while a smaller part (the auxiliary part) AP is wound with a shorter pole-pitch or pitches. For example a conventional 10 pole frame could be wound with 4-1+-4-1+ poles, the 1+ indicating the shorter pole pitch with more than a whole pole in the space normally used for one pole. The dimensions for MP and AP in the figure are not necessarily those used in practice and are purely diagrammatic.

The winding is made so that one connection can be made to the conventional "main" poles as a group and another connection to the shorter pole-pitch "auxiliary" poles as a group. In operation the "main" poles will generally be supply-excited and the "auxiliary" poles rotor-excited although this is not the only possible arrangement and is not a limitation on possible arrangements within the scope of the invention.

This aspect of the present invention provides that the "main" winding parts are connected in parallel to the inverter output while the two or more "auxiliary" winding parts are connected together in a loop (NC) to permit the circulation of an equalizing current $I_3$.

In the prior art example to produce equal torque, $T_m$, from each machine with a different axle speed $S_1$, $S_2$ the inverter output frequencies f1, f2 must be adjusted by a control action to equalize the torque. In the arrangement embodying the invention the torque is equalized without any external control action by the flow of current along connection NC. The current, $I_3$, in connection NC is the product of a constant, k, and the difference of the axle speeds $S_1$, $S_2$; that is $$I_3 = k(S_1 - S_2).$$

The equalization current flow provides speed control without external control by electronic devices (signal or power types) by using the phase of the rotor-induced voltage alone to control the maximum current flowing to the main windings. Provided the load profile is known in advance, as would be the case in traction and other multiple motor applications, such as rolling mills, torque control can be achieved in this way. The control loop can be considered as including the supply-excited main pole windings and electrically-isolated rotor-excited auxiliary pole windings of one machine magnetically coupled through the common stator core and electrically connected through the parallel supply connections and series auxiliary pole connection to the other magnetically coupled machine windings. The control loop provides a self-compensating equal torque characteristic for the connected machines, which may be more than two in number in which case all the auxiliary pole windings are connected in series.

In designing the windings the rotor-induced voltage should be about equal, say within one or two percent, to the supply line voltage. Also the exit-edge KVA loss, between the main and auxiliary poles should not vary significantly with slip. The "Goodness Factor" should be large; values in the hundreds are desirable. The number of poles in each main pole group should be higher rather than lower. Thus in a 12 pole frame 3-1+-3-1+-3-1+ is preferred to 2-1+-2-1+-2-1+-2-1+ although undesirable unbalanced magnetic "pull" characteristics increase. The "3 - 1+" arrangement can have a speed control range of 10% of synchronous speed, which should be more than adequate for torque equalization. Excess rotor losses fall with main pole group size and values similar to core iron loss are attained for "3-1+" so speed control can take place effectively at constant efficiency. The losses are therefore less than those with thyristor control and in a.c. commutator machines. The distinction from stepped speed-control achieved by pole-switching or switched pole amplitude modulation is emphasised as the present invention provides continuous control, although in some cases over a limited range.

Figure 7:
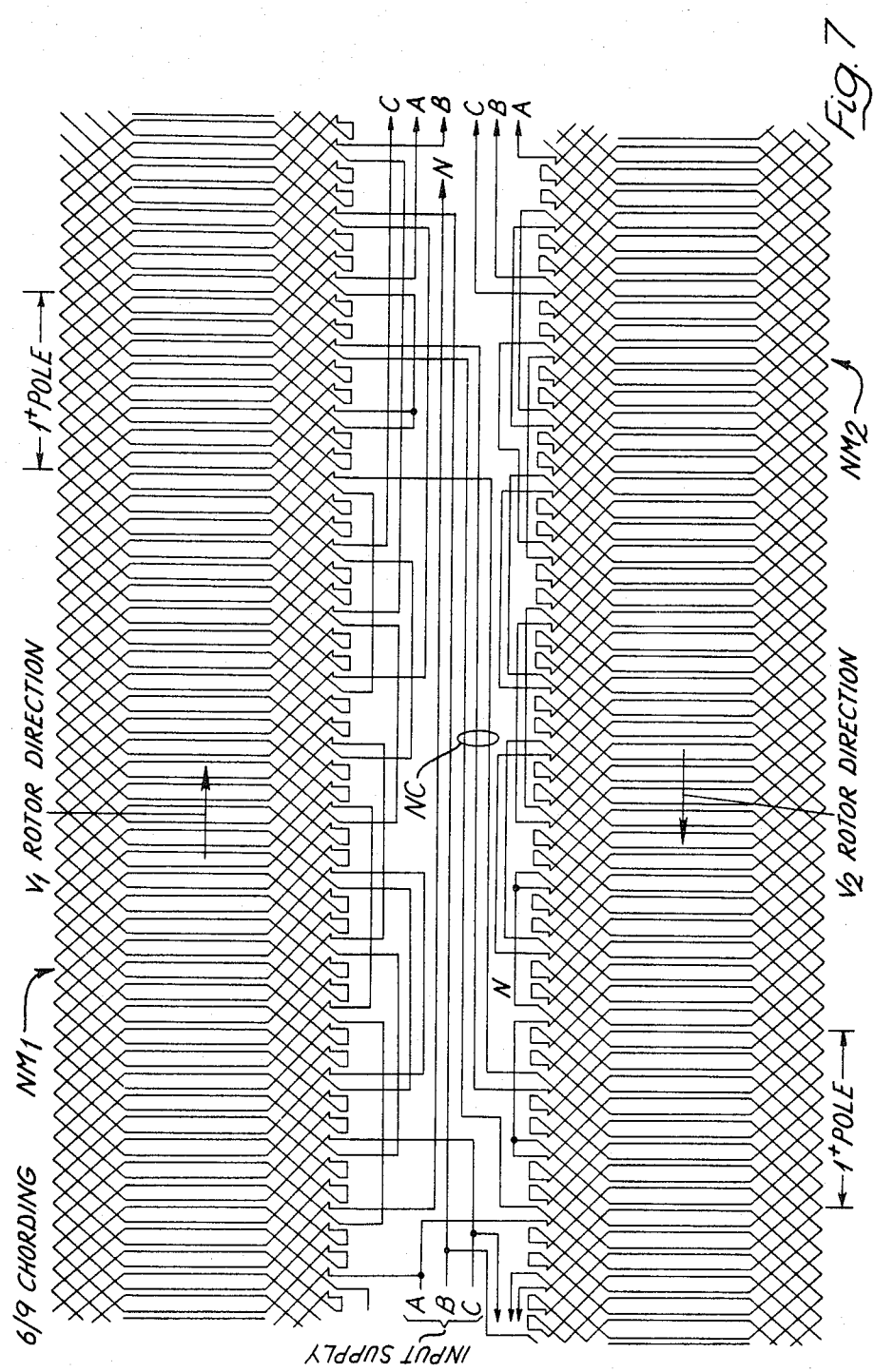
FIG. 7 shows one repeatable section of a winding layout for the motors of FIG. 6.

FIG. 7 shows one repeatable section and interconnections for two machines driving separate traction axles via cage rotors. Each machine is on a conventional 10 pole frame and of 4-1+-4-1+ type.

While described in terms of traction motors for individually driven railway vehicle axles the invention is also applicable to other multiple-machine arrangements such as metal-working mills and material conveyors where variation of speed of an individual drive can affect torque equality.

In addition to the control of speed and/or torque to be substantially constant under varying load or to be variable over a range there is a need for traction purposes in particular to vary the operating speed of a machine by varying the supply frequency. Techniques for achieving such variation using inverters, e.g. that shown in FIG. 5, are well known but the problems associated with forced electronic or artificial commutation of the thyristor devices, using capacitors to provide the commutation energy, are also well known and a drawback to the use of inverter-based speed control which is otherwise very attractive.

FIG. 11, at 11a, 11b, 11c, shows three known variable speed motor arrangements using an inverter in an a.c.-to-a.c. conversion at variable voltage and variable frequency to operate an a.c. traction or similar drive motor from the a.c. mains to provide a variable speed drive. In each type the three-phase a.c. supply at a fixed frequency f1, say 50 or 60 Hz, is changed to direct current at an adjustable voltage by a six-phase delay rectifier. An inductor is included in the connection between the output of the rectifier and the input to the inverter.

In FIG. 11a the inverter is a line, or naturally, commutated current source inverter CSIA which uses six semi-conductor controlled rectifier devices, e.g. silicon thyristors, to provide a three-phase a.c. output at a variable frequency fv. Frequency fv is to be variable from zero to a value dependent on the number of poles of the motor and the required speed but an upper value of 70 to 200 Hz covers most usual requirements. The variable frequency output of inverter CSIA is applied both to a cage rotor induction motor CRMA and to a synchronous condenser machine SCA. The synchronous condenser also requires a d.c. supply for the field winding.

In FIG. 11b the inverter is a forced-commutated current source inverter CSIB which uses six main thyristors, six commutation thyristors and six commutation capacitors to supply a cage rotor induction motor CRMB.

In FIG. 11c the inverter is a line or naturally commutated, as in 11a, and is a current source inverter CSIC which supplies a variable frequency and voltage to a synchronous motor SMC. The synchronous motor also requires a d.c. supply for the field winding or else, if this is practical, a premanent magnet to provide this field.

Each of the above known arrangements has advantages and disadvantages for any specific use and power level. These are partly economic as the relative cost of the various components changes with power level and partly technical as some techniques are appropriate to certain power levels only. Broadly the FIG. 11a arrangement is for powers of 10 MW and upwards, the FIG. 11b arrangement for powers of up to 100 kW and the FIG. 11c arrangement for powers of 100 kW to 10 MW with permanent magnet fields only possible at the lower power levels.

It will be clear that all the known arrangements require either the inverter or the machine(s) to be complex in order to achieve reliable commutation. In particular when the machines are complex they require a separate d.c. supply which greatly increase costs and operational work load.

Figure 8:
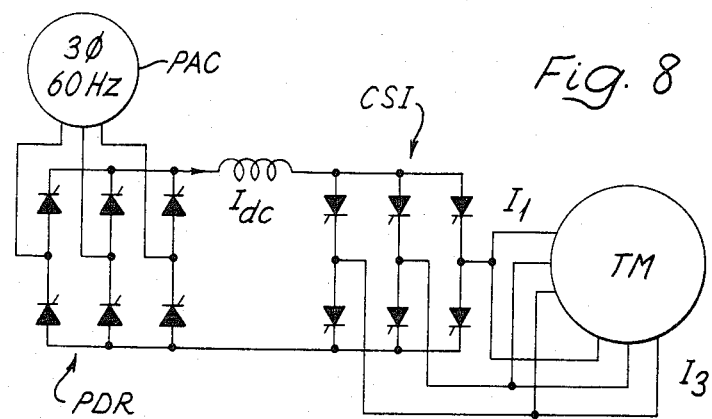
FIG. 8 shows a naturally commutated induction motor drive embodying the invention.

FIG. 8 shows in outline an arrangement in which the inverter providing the variable frequency for the machine does not require artificial commutation. A suitable supply of electrical power PAC, typically three-phase 60 Hz mains at a convenient voltage, is applied to a phase delay rectifier PDR to produce direct current at a controllable potential. The direct current is applied, through a suitable inductor if required, to a current source inverter, CSI. The output of the inverter is alternating current of a controllable frequency which is applied to a θ-pinch machine, TM, as described in the above-mentioned Applications and published paper. The "mains" and "rotor" poles (or motoring and asynchronous condenser poles) of the machine are both connected to the output of the inverter and the machine thus provides line-commutation of the inverter without the need for commutation capacitors, diodes etc. The d.c. link from the phase delay rectifier to the inverter prevents the flow of reactive power so a reactive power balance must be achieved in the inverter and motor. The reactive (leading) power to commutate the inverter devices is provided by the "rotor" poles of the machine.

Figure 9:
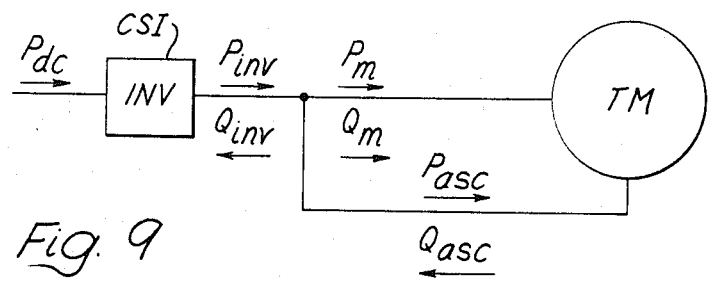
FIG. 9 shows an outline of power flow in the drive of FIG. 8.

FIG. 9 illustrates the balance of real and reactive power when the arrangement of FIG. 8 is operating with natural commutation. The reactive (leading) power from the "rotor" pole (condenser) windings, $Q_{asc}$, supplies the reactive power to the motor, $Q_m$, and the reactive power to commutate the inverter, $Q_{inv}$. The real power flow ($P_m$, $P_{inv}$, $P_{asc}$) is also shown. The real power supplied to the condenser windings ($P_{asc}$) is used for the additional stator copper ($I^2R$) loss while the real power to the motor windings is used for motor stator copper loss, rotor copper loss and mechanical power. However the direction of flow of $P_{asc}$ can be controlled by the design of the machine and can be made zero or negative (at high slip) if required.

When the above described arrangements are compared with the prior art arrangements exemplified by FIG. 11 the following advantages are seen:
 A.(a) No commutation capacitors and devices are required (e.g. FIG. 11b).

A.(b) A separate synchronous machine is not required (e.g. FIG. 11c).

A.(c) Separate field excitation by direct current (FIGS. 11a and 11c), also requiring slip-rings, a permanent magnet (FIG. 11c), which is heavy and expensive, is not required.

A.(d) Harmonic currents, $I_3$ FIG. 8, are filtered into the asynchronous condenser path instead of entering the torque-producing winding with the fundamental current, $I_1$ in FIG. 8, and affecting the smoothness of the drive from the arrangement.

In operating an arrangement such as that exemplified in FIG. 8, the following conditions are desirable:

B.(a) The value of Volts/Hertz at the motor should be substantially constant as constant-slip operation is preferred.

B.(b) The phase delay rectifier PDR should be controlled to regulate the d.c. link to achieve the constant Volts/ Hertz ratio.

Such arrangements can produce a considerable range of running speeds at high power levels. At the 100 kW level a speed range of 7:1 is attainable while at the level of 1 MW or more a speed range of 3:1 is attainable. The speed is continuously variable in the range. The restriction of speed range at higher powers is not usually a limitation as a range of say 1,000 rpm to 3,000 rpm is more than enough to meet practical requirements at the megawatt level.

The arrangements can also provide a braking mode with a regenerative action achieved by reversal of the voltage polarity in the d.c. link. In practice the characteristics of the mains supply, such as impedance, may limit the effective range of regenerative braking.

A 150 h.p. 4-1+-4-1+ pole machine has been built on a commercial 10 pole frame and operated as a variable speed drive using an inverter having thyristors (International Rectifier type 101 RC 60) mounted on individual heat sinks and controlled by gating signals generated in a control logic unit but without the use of commutation capacitors or diodes.

In operation the machine runs at 10 pole speed. The machine is controlled to run always at a slip value appropriate to ensure adequate commutation power. As with all commutation techniques a certain minimum time must be allowed not a quantity expressed in electrical degrees. Therefore at low frequencies, e.g. below 15 Hz for 150 h.p., blanking of the d.c. link current by use of the phase delay rectifier in a pulsing mode is employed. This is the manner in which the machine is started and run-up to the natural commutation speed, say 15 Hz, above which natural commutation is effective until the upper frequency limit is reached. The upper frequency limit is reached when a safe commutating margin can no longer be reached. For typical devices at the 150 h.p. machine level the commutation time is 30 microseconds.

By consideration of the equivalent circuit of the machine at high speed and the accepted conventions on thyristor commutation a limiting frequency of 200 Hz, at which the available commutation time, including a 20 microsecond safety margin, of 50 microseconds is obtained. Another approach is to consider the operating point at which unity power factor is reached for the machine.

For the machine whose details are given below at a slip of 0.075 the commutation margin is adequate about 120 Hz. Operation up to about 200 Hz is possible with a slip of 0.035. The machine is an 8 pole traction motor with about 3½ poles of motoring winding in each of two repeated sections. Other details are as follows:

| | |
|---|---|
| Pole pitch (m) | 0.194 |
| Stator slots | 72 |
| Bor diam (m) | 0.495 |
| Rotor bars | 94 |
| Air gap (mm) | 1.14 |
| Current density (A/mm$^2$) | 3.6 |
| Temperature rise (°C.) | 75 |
| Max torque (Nm) | 5010 |
| Current loading (kA/m) | 48 |
| Rated slip | 0.02 |
| Mechanical output at 100Hz (kW) | 224 |

The commutation limitations reflect the characteristics of currently available thyristors and not a fundamental property of the arrangements. As the turn-off time of the thyristors becomes shorter the power factor of the motor will approach unity, from the leading direction. Thyristors for the 100 kW to 10 MW power range at present require a commutation safety margin of 20 microseconds and the induction motor then requires a leading power factor of 0.95 to 0.90 to operate at up to 200 Hz i.e. 12,000 rpm for a 4 pole machine. In typical applications line commutation at constant-torque, constant-slip and constant current is achievable for 15 Hz to 100 Hz i.e. 900 rpm to 6,000 rpm. However as thryristor characteristics improve the motor power factor can approach unity.

In start-up the phase delay rectifier is blanked at 60° intervals to produce current commutation from the input side. At about 15 Hz inverter frequency the effective value of the reactive output of the machine, which increases with frequency, is high enough to cause commutation and this can then take over. The inverter requires about 11% of the reactive power supplied to the "motoring" section ($Q_m$ above) with a device turn-off time of 30 microseconds.

As described so far the arrangement has eliminated electrostatic storage devices from the commutation process but still requires a special low-speed and start-up procedure. This can be overcome by the use of two identical PDR-d.c.-link-CSI chains with their inputs and outputs in parallel. In FIG. 12 by slowly increasing the current from each rectifier, PDR1, PDR2, but in the opposite sense (polarity), for example using ramp to give constant dIdc/dt of say 2A/ms the combined output of the inverters CSI1, CSI2 is a nearly perfect sinusoid at an appropriate voltage-dependent low frequency, with a small component at twice power frequency, which is applied to a θ-pinch machine TMC. Despite the cost and weight penalty of the extra 12 devices the arrangement is still better than a capacitor/diode commutation arrangement. In a typical arrangement the twice power frequency component is less than 5%. This arrangement overcomes a possible problem in some applications of the torque pulsating resulting from the on-off current of the pulsing start-up mode.

The θ-pinch machine can also provide a filter action to suppress unwanted current harmonics or incoming line transients. The filter action is determined by the speed of the rotor which sets the fundamental frequency of the filter frequency response. The energy is absorbed into the rotor where the cage construction can well withstand the heating effect. For example the "rotor" pole (condenser) winding can be parallel connected to the "mains" (motoring) pole windings and have a reactance minimum at the fifth harmonic of the travelling wave to suppress the dominant harmonic of the inverter which minimum automatically "follows" the inverter frequency.

A further field of application of the invention is in the connection of two a.c. supply networks, such as those of separate public utilities or other large-scale generation and distribution systems, to permit power flow. The frequency of such supply networks is not always synchronised so interconnection is not practical. One solution is to connect via a direct current link which overcomes the problem of the difference in frequency. Another solution is to use a machine on each system and couple the rotors mechanically and electrically. This requires wound rotors even if slip rings can be avoided by the use of two rotors on one shaft. With suitable auxiliary plant to cause the rotors to rotate at a selected speed in one or other direction power can be transferred in either direction. Even when both machines are assembled in one frame each has to have the capacity to operate at the maximum power transfer level. Also care has to be taken to avoid interaction between the two machines (U.S. Pat No. 3,975,646 refers).

Figure 10:
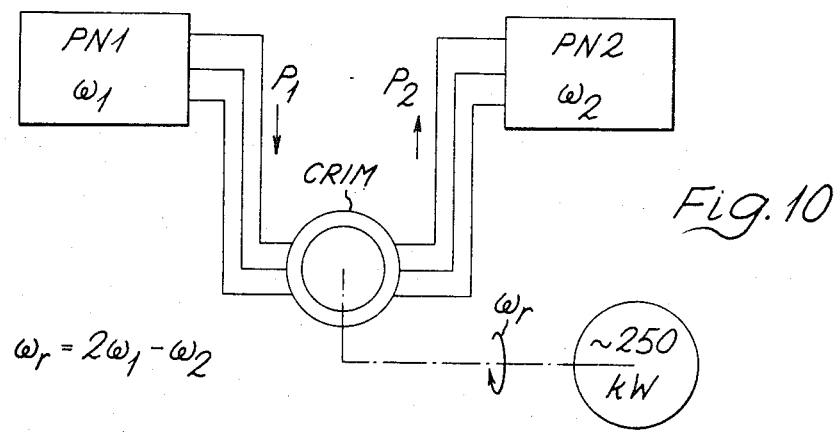
FIG. 10 shows an arrangement embodying the invention in a link between two power distribution networks.

FIG. 10 shows an asynchronous power tie provided by a single cage rotor induction machine (CRIM) having two stator sections according to the present invention. Power is transferred from a stator section of the machine which is connected to one power system (PN1) to another stator section of the machine which is connected to the other system (PN2) via the cage rotor. The cage rotor is driven by a suitable servo drive through a mechanical link indicated by the chain dotted line. The cage rotor is driven at a speed $\omega_r$ given by the expression:

$$\omega_r = 2\omega_1 - \omega_2.$$

Here $\omega_1$ is the synchronous speed of network PN1 and $\omega_2$ the synchronous speed of network PN2.

When compared with the prior art system mentioned above there are substantial savings in both the main machine and the drive. The main machine is simpler, being of cage rotor not wound rotor construction and the drive can be smaller for a given power transfer capacity of the tie possibly as small as half the size for the prior art.

The arrangement described thus provides significant cost savings and simplification.

The techniques described above provide a range of control on speed, torque and other operating characteristics of machines by making use of electromagnetic machine action based on reactive voltampere control. Clearly the techniques can be applied to generators of electricity as well as to motors operated by electricity.

I claim:

1. An alternating current electrical machine arrangement comprising:
   a primary winding for connection to an alternating current electrical circuit of a predetermined frequency;
   a secondary winding mounted in a spaced relationship with and for relative motion with respect to the primary winding an electrically isolated to define a flux permeable gap therebetween with relative motion between said primary and secondary windings coupling them by electromagnetic effects;
   said primary and secondary windings formed of electrical conductors distributed in predetermined patterns along the extent of the flux permeable gap therebetween;
   at least one of said predetermined patterns of electrical conductors having a non-regular and non-uniform portion along the flux permeable gap for creating and maintaining at least one transient of electromagnetic field conditions along at least portions of the flux permeable gap;
   said at least one transient comprising a change from one effective field speed to another from point to point along the flux permeable gap;
   said at least one of said predetermined patterns of conductors being provided by a winding including at least a first and a further separate part; and
   means to alter a current in a said first part of a winding whereby at least one of said effective field speeds is altered to vary the speed of the machine.

2. An arrangement according to claim 1 including a variable impedance as said means to alter current in said first winding part and provide control of speed and means to connect a said further separate winding part to an electrical power network.

3. An arrangement according to claim 1 including means to connect a said further separate winding part to an electrical power network in a specific phase arrangement and means for connecting said first winding part to said network in a different phase arrangement and means to vary the phase to apply machine induced voltage to said further winding parts in parallel with said power network voltage with a phase variable in operation to produce a self-compensating equal torque characteristic around the synchronous speed.

4. An electrical machine arrangement according to claim 1 including means for connecting separate winding parts to separate a.c. power distribution networks to permit power flow from one network to another through the machine arrangement despite absence of synchronism between the networks.

* * * * *